US011585679B2

(12) United States Patent
Ocket et al.

(10) Patent No.: US 11,585,679 B2
(45) Date of Patent: Feb. 21, 2023

(54) SENSOR DEVICE FOR MEASURING THE ROTATIONAL POSITION OF AN ELEMENT

(71) Applicants: TE Connectivity Belgium BV, Oostkamp (BE); TE Connectivity Germany GmbH, Bensheim (DE)

(72) Inventors: Tom Ocket, Oostkamp (BE); Tobias Becker, Speyer (DE); Moritz Harz, Speyer (DE)

(73) Assignees: TE Connectivity Germany GmbH, Bensheim (DE); TE Connectivity Belgium BVBA, Oostkamp (BE)

( * ) Notice: Subject to any disclaimer, the term of this patent is extended or adjusted under 35 U.S.C. 154(b) by 0 days.

(21) Appl. No.: 17/016,822

(22) Filed: Sep. 10, 2020

(65) Prior Publication Data

US 2021/0080291 A1 Mar. 18, 2021

(30) Foreign Application Priority Data

Sep. 12, 2019 (EP) ..................................... 19196863

(51) Int. Cl.
*G01D 5/20* (2006.01)
(52) U.S. Cl.
CPC .................................. *G01D 5/2073* (2013.01)
(58) Field of Classification Search
CPC ........................... G01D 5/2073; G01D 5/2086
See application file for complete search history.

(56) References Cited

U.S. PATENT DOCUMENTS

| 6,084,400 | A | * | 7/2000 | Steinich | G01P 3/4815 |
| | | | | | 324/207.13 |
| 6,600,311 | B1 | * | 7/2003 | Tawaratsumida | G01D 5/2013 |
| | | | | | 324/207.16 |
| 7,538,544 | B2 | * | 5/2009 | Lee | G01D 5/2053 |
| | | | | | 324/207.17 |
| 2010/0308808 | A1 | * | 12/2010 | Yamagata | G01D 1/00 |
| | | | | | 324/207.25 |
| 2016/0223358 | A1 | | 8/2016 | Ausserlechner | |
| 2020/0025550 | A1 | * | 1/2020 | Utermoehlen | B60D 1/02 |
| 2020/0072643 | A1 | * | 3/2020 | Qama | G01D 5/2053 |
| 2020/0166377 | A1 | * | 5/2020 | Buchinger | H05K 1/142 |

FOREIGN PATENT DOCUMENTS

| CN | 106767386 A | * | 5/2017 | |
| DE | 102015220624 | | 4/2017 | |
| JP | 2018151230 | | 9/2018 | |
| WO | WO-2018206318 A1 | * | 11/2018 | ............... G01B 7/30 |
| WO | 2019014690 | | 1/2019 | |

OTHER PUBLICATIONS

Appendix to the specification Nov. 26, 2018 (Year: 2018).*
Extended European Search Report, European Application No. 19196863.5-1010, European Filing Date, Feb. 18, 2020.

* cited by examiner

*Primary Examiner* — Walter L Lindsay, Jr.
*Assistant Examiner* — Milton Gonzalez
(74) *Attorney, Agent, or Firm* — Barley Snyder (57) ABSTRACT

A sensor device for measuring a rotational position of an element that is rotatable about an axis of rotation includes a pair of sensing elements. The sensing elements are shifted with respect to each other by at least 120 degrees about the axis of rotation.

17 Claims, 8 Drawing Sheets

SENSOR DEVICE FOR MEASURING THE ROTATIONAL POSITION OF AN ELEMENT

CROSS-REFERENCE TO RELATED APPLICATION

This application claims the benefit of the filing date under 35 U.S.C. § 119(a)-(d) of European Patent Application No. 19196863.5, filed on Sep. 12, 2019.

FIELD OF THE INVENTION

The present invention relates to a sensor device and, more particularly, to a sensor device for measuring the rotational position of an element that is rotatable about an axis of rotation.

BACKGROUND

Sensor devices for measuring the rotational position of an element that is rotatable about an axis of rotation are not very tolerant towards misalignment.

SUMMARY

A sensor device for measuring a rotational position of an element that is rotatable about an axis of rotation includes a pair of sensing elements. The sensing elements are shifted with respect to each other by at least 120 degrees about the axis of rotation.

BRIEF DESCRIPTION OF THE DRAWINGS

The invention will now be described by way of example with reference to the accompanying Figures, of which.

DETAILED DESCRIPTION OF THE EMBODIMENT(S)

The invention will now be described in greater detail and in an exemplary manner using embodiments and with reference to the drawings. The described embodiments are only possible configurations in which, however, the individual features described herein can be provided independently of one another or can be omitted.

Figure 1:
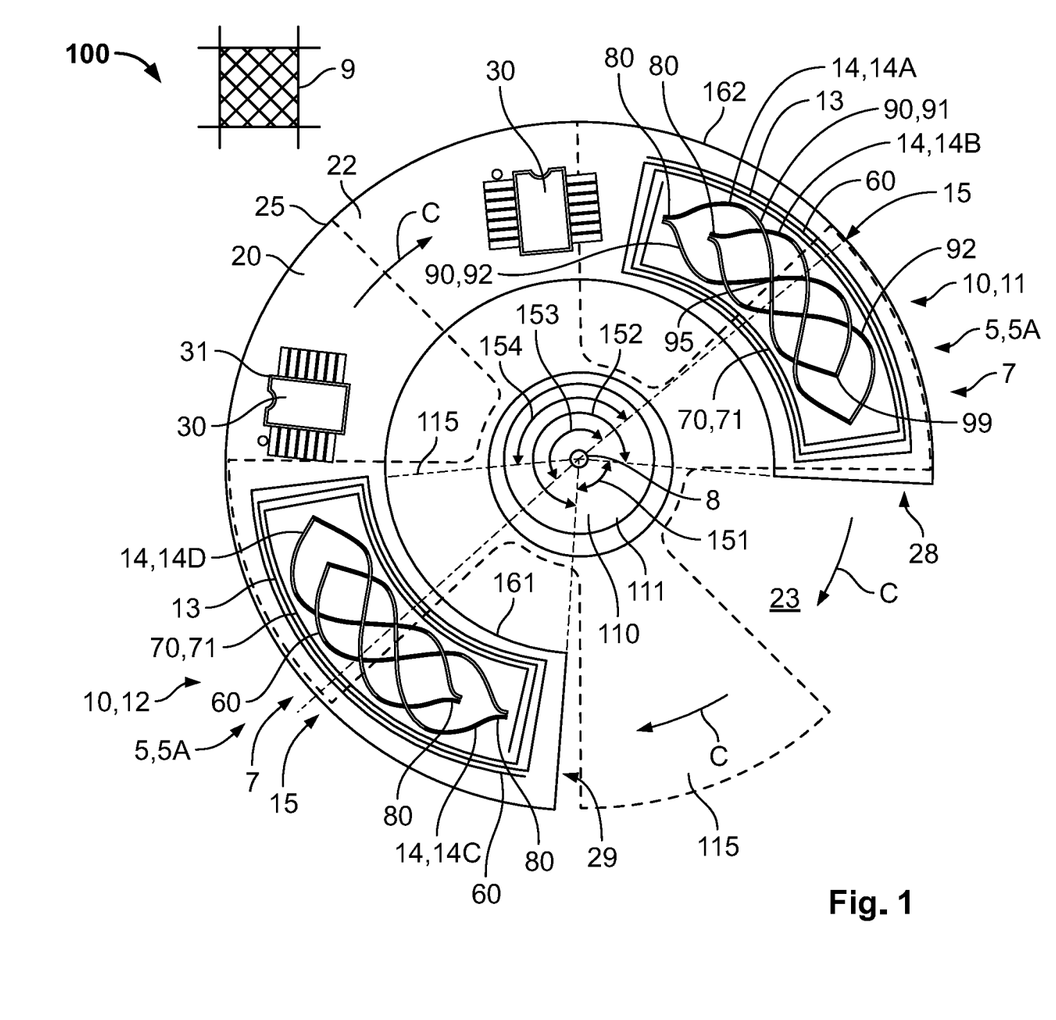
FIG. 1 is a schematic diagram of a sensor device according to an embodiment.

In FIG. 1, a sensor device 100 for measuring the rotational position of an element 110 that is rotatable about an axis of rotation 8 is shown. The rotatable element 110 is a shaft 111, for example a shaft of a car engine.

The sensor device 100, as shown in FIG. 1, comprises two sensing elements 5, in particular two electromagnetic sensing elements 7 in the form of two electromagnetic transducers 10, wherein each transducer 10 has at least one sender member 13 for emitting a magnetic field and at least two receiving members 14 for receiving the magnetic field. In further embodiments, the sensor device 100 can have sensing elements 5 that are based on optical measurements, measurements of the Hall-effect or the Magnetic Resistance or other measurement principles. A metallic element is attached to the rotatable element 110 such that it rotates with the element 110.

In the embodiment shown in FIG. 1, four flaps 115 are connected to the shaft 111 and protrude sideways away from the shaft 111 perpendicular to the axis 8. The flaps 115 disturb the magnetic field generated by the sender members 13 so that the receiving members 14 receive different magnetic strengths of the magnetic field depending on the position of the flaps 115 and thus on the rotational position of the element 110. From the signals received by the receiving members 14, the rotational position of the element 110 can hence be deduced.

The sensor device 100 comprises two sensing elements 5 that are shifted with respect to each other by at least 120 degrees about the axis of rotation 8, or more than 150 degrees. In the depicted example of FIG. 1, the two sensing elements 5 in the form of the two transducers 10 are shifted by approximately 180 degrees. This means that corresponding parts on the two sensing elements 5 are shifted by approximately 180 degrees. For example, central parts 15 of the two sensing elements 5 are shifted by 180 degrees. In other embodiments, the sending elements 5 can be shifted by less than a full rotation, i.e. less than 360 degrees. The shifting angle 153 is measured along the sensor device 100, in particular along a circumferential direction C that runs around the axis 8 and is perpendicular to a radial direction R pointing away from the axis 8.

Thus, the two sensing elements 5 of FIG. 1 are arranged opposite to each other relative to the axis 8. The advantage of such a configuration is that if, for example, the axis 8 shifts without rotating, the sensor device 100 can still measure the rotational position accurately as an error induced in one of the two transducers 10 is compensated by an opposite error in the other transducer 10. In other words, a first sensing element 5, 5A in the form of a first transducer 10, 11 is shifted by 180 degrees around the axis 8 relative to a second sensing element 5, 5B in the form of a second transducer 10, 12. This resembles a two-fold rotational symmetry.

Due to the fact that the transducers 10 each have a rotational extension, the rotational distance between the two transducers 10 is less than the shifting angle 153. An angle 154 of the rotational distance shown in FIG. 1 can, for example, be at least 90 degrees or around 100 degrees in this case. This angle 154 can be measured from the end of one transducer 10, 11 to the neighboring end of the other transducer 10, 12.

The sensor device 100 comprises an arcuate carrier 20 with an opening 23 that is adapted to receive the rotatable element 110 perpendicular to the axis 8. The element 110 can thus be inserted sideways. This can be used to mount or unmount the sensor device 100 easily, for example, if it is necessary to replace the sensor device 100. The sensor device 100 and in particular the arcuate carrier 20 has a substantially partially annular shape or C-shape. An inner edge 161 and an outer edge 162 of the arcuate carrier 20 are arc-shaped, as shown in FIG. 1. The carrier 20 can be planar, with a plane of the carrier 20 perpendicular to the axis of rotation 8.

Each of the transducers 10 is arranged closer to one end 28, 29 than to a central part 25 of the arcuate carrier 20, as shown in FIG. 1. Thus, each of the transducers 10 is arranged on one end 28, 29 of the arcuate carrier 20, the two transducers 10 being arranged on two opposite ends 28, 29.

The arcuate carrier 20 extends for more than 180 degrees around the axis 8. In various embodiments, the arcuate carrier 20 extends for more than 210 degrees, or for more than 240 degrees around the axis 8. In the depicted example shown in FIG. 1, the angle 152 of the extension of the arcuate carrier 20 is approximately 270 degrees. Consequently, an angle 151 over which the opening 23 extends is approximately 90 degrees. The opening 23 provides an access channel for the rotatable element 110, the channel having at its narrowest part an inner width approximately 1.5 times to 2 times the diameter of the shaft 111 in order to allow an easy mounting.

In the embodiment shown in FIG. 1, the sensor device 100 comprises a pair of controllers 30 which are embodied as integrated circuits 31. Each of the controllers 30 is used for controlling one transducer 10. The data of the two controllers 30 can then be processed in a further, non-depicted module. Both controllers 30 are arranged on the arcuate carrier 20 between the two transducers 10. In another embodiment, only one controller 30 could be present for controlling both transducers 10.

Each of the receiving members 14, as shown in FIG. 1, has a pair of conductors 90 embodied as conductive paths 60 on a printed circuit board (PCB) 22. The conductive paths 60 resemble graphs of a periodic function, in particular a sine function. The conductors 90 thus have an elongated shape that is sinusoidal. The first conductor 90, 91 starts at a contact section 80 and runs over one period of the periodic function along a circumferential direction C. At a junction 99, it is connected to the second conductor 90, 92 which runs against the circumferential direction over one period back to the contact section 80. At a crossing 95, the first and the second conductor 90, 91, 92 are arranged on different levels, for example on a front side and a back side of the PCB 22. The sine function is used because it allows an easy calculation of the rotational angle by calculating the arctan.

The sender members 13, as shown in FIG. 1, are conductive paths 60 that form coils 70, in particular spiral coils 71 on the arcuate carrier 20, which is embodied as the PCB 22. When running a current through the sender members 13, a magnetic field results which is then disturbed by the flaps 115 and received by the receiving members 14. Depending on whether the current runs in one direction or the other, for example clockwise or counterclockwise in the sender member 13, the magnetic field is directed in one direction or the other.

When coupling the two sender members 13, one sender member 13 can be embodied to generate a magnetic field in one direction and the other sender member 13 can be adapted to generate a magnetic field in the opposite direction. Through this, an external magnetic field which runs parallel to the axis 8 and which disturbs the measurement, can be compensated as it is added to one of the magnetic fields and subtracted from the other magnetic field of the sender members 13. The effect of the external magnetic field is thus cancelled. One transducer 10, 11 can thus be configured to emit and receive a first magnetic field that has at the receiving members 14, 14A, 14B, a direction that is opposite to a direction of the second magnetic field emitted and received by the other transducer 10, 12 at the corresponding receiving members 14, 14C, 14D.

In an embodiment, the magnetic fields that are generated are alternating magnetic fields. These magnetic fields can be generated by applying alternating currents at the sender members 13.

In an embodiment, the two sender members 13 can be coupled or connected to each other directly or indirectly to allow an easy control. The sender members 13 can be connected by a single electrical connector. Similarly, the receiving members 14 of the two transducers 10 can be connected or coupled to each other directly or indirectly.

Each of the receiving members 14 is a conductive path 60 on the PCB 22, as shown in FIG. 1. The conductive path 60 resembles a graph of a periodic function, in particular a sine or a cosine function. It starts at a contact section 80 and runs over one period of the periodic function along a circumferential direction C. The path then changes the sign of the periodic function and runs against the circumferential direction C over one period back to the contact section 80. Each of the receiving members 14 thus encloses or surrounds two convex areas and resembles two eyes. In each transducer 10, the two receiving members 14 are shifted by a quarter of a period of the periodic function.

In order to avoid a crossing of the conductive paths 60, parts of the conductive paths 60 can be arranged on different levels which are, for example, separated by insulating layers or which can be arranged on a front side and a back side of the PCB 22. In order to further minimize the errors, the two transducers 10, 11, 12 can be configured identically, each with a first receiving member 14, 14A, 14C and a second receiving member 14, 14B, 14D, as shown in FIG. 1. The first receiving member 14, 14A of one transducer 10, 11 can be coupled with the second receiving member 14, 14D of the second transducer 10, 12. The coupling can again be through an intermediate element, for example, a single intermediate element so that the raw electrical signals are combined, or indirectly coupled via further elements, for example a controller, so that the results are compared. The second receiving member 14, 14B can be coupled with the first receiving member 14, 14C of the other transducer 10, 12 to further improve precision.

In the embodiment shown in FIG. 1, four flaps 115 are used. The cross-coupling of the first and the second receiving members 14 in the first and the second transducer 10 thus leads to the fact that the signals from the two transducers 10 are not shifted by 180 degrees, which would be the physical shifting of the two transducers 10, but by (180°-90°/4) which is 157.5°. Thus, when the signals are added up, the sine and the cosine will be identical. In another embodiment, when an odd number of flaps 115 is present, it is not necessary to change the relative angle between the two transducers 10. The two transducers 10 can be located 180° to each other as a 180° shifting would not result in an exact mirroring.

In each of the transducers 10, the sender member 13 surrounds the receiving members 14 to save space. The sender members 13 and the receiving members 14 are basically flat or planar and lie in the plane 9 shown in FIG. 1 that is perpendicular to the axis 8. The entire sensor device 100 is basically a flat element arranged in this plane 9.

Figure 2:
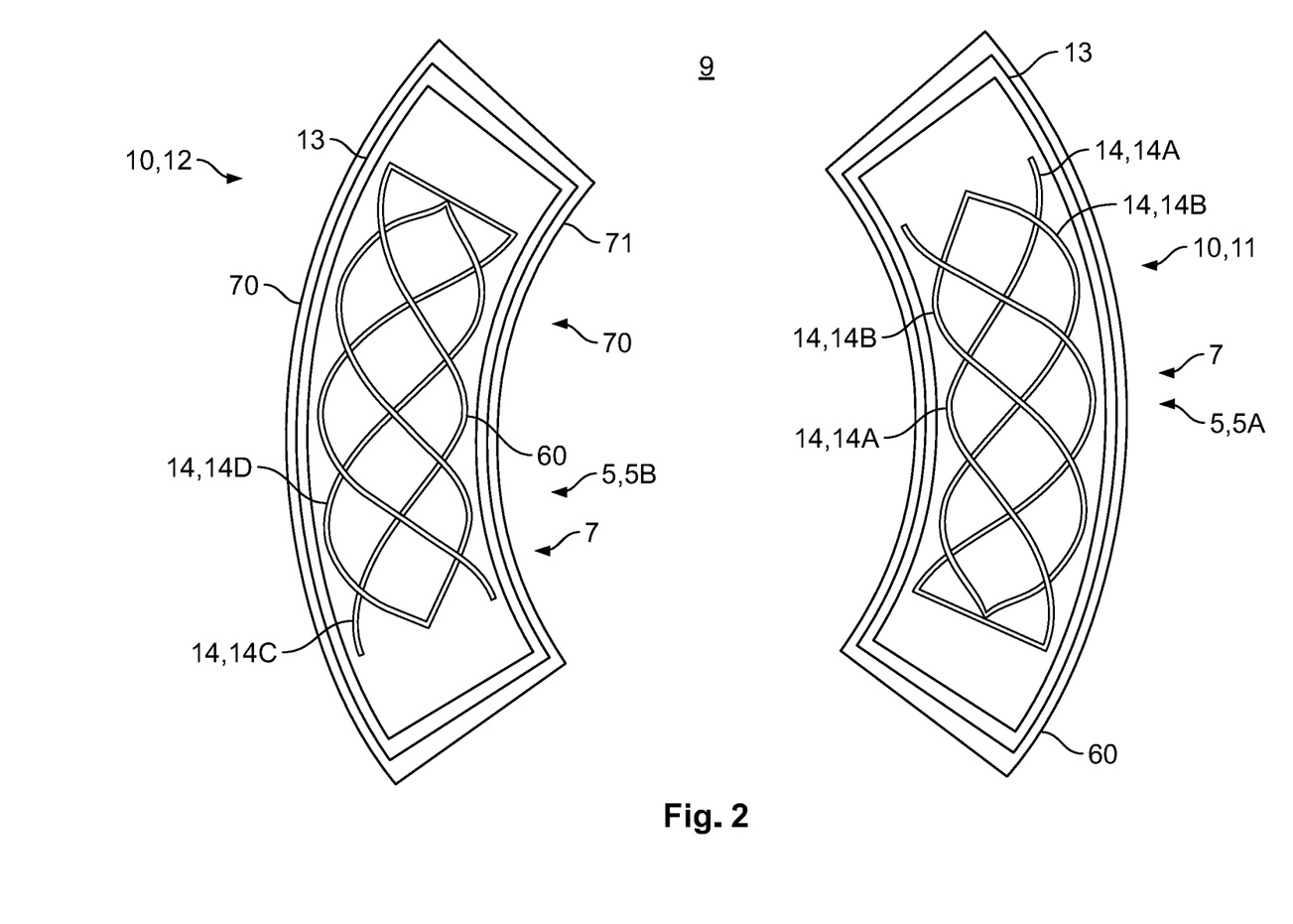
FIG. 2 is a schematic diagram of a pair of sensing elements of the sensor device.
Figure 3:
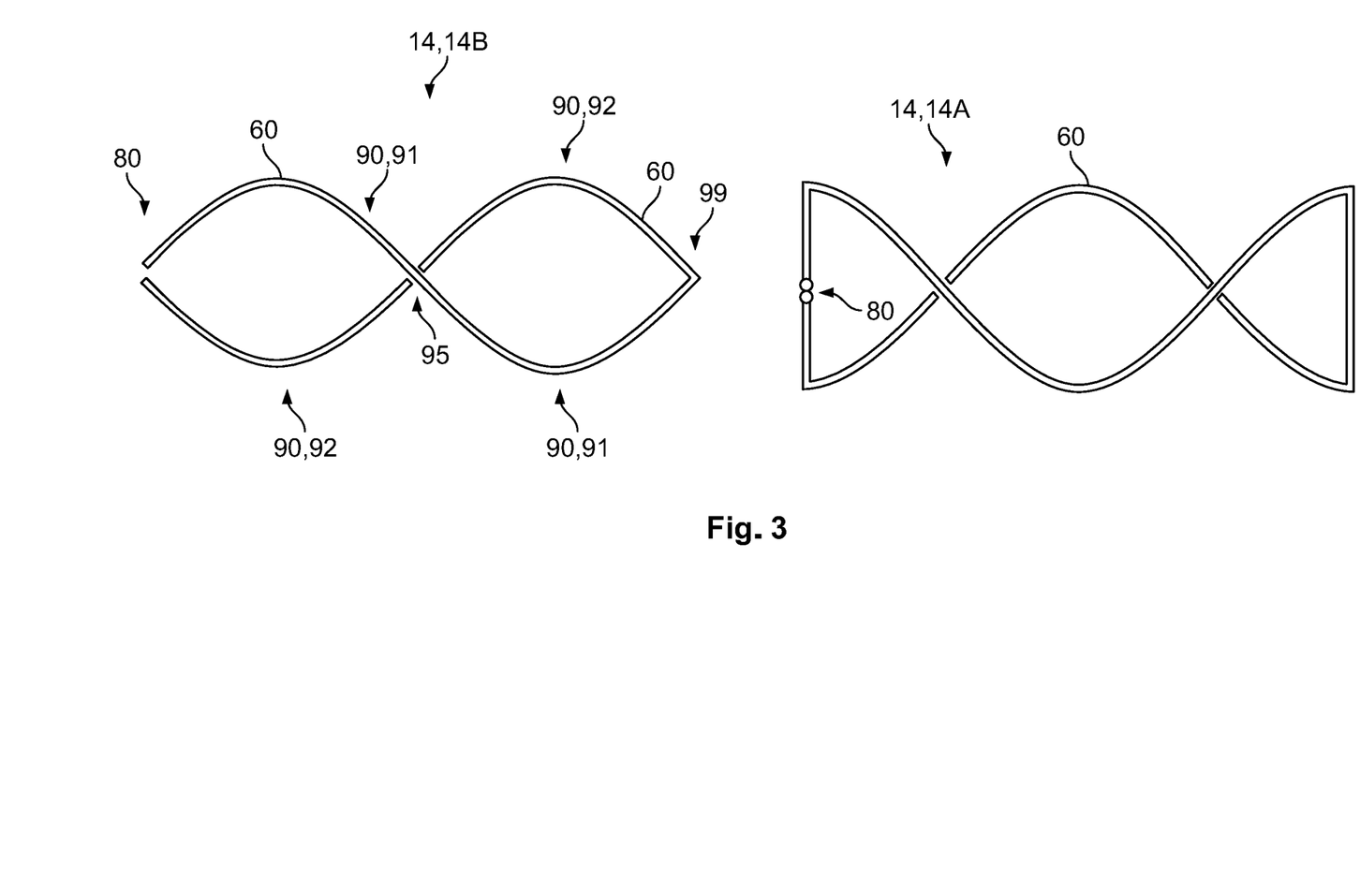
FIG. 3 is a schematic diagram of receiving members of the sensor device.

In another embodiment shown in FIGS. 2 and 3, one of the receiving members 14 in each transducer 10 is embodied more like a candy or interwoven shape in contrast to the eye-shaped configuration shown in FIG. 1. The combination of the two receiving members 14 in each transducer 10 is thus shorter than the configuration shown in FIG. 1.

Figure 4:
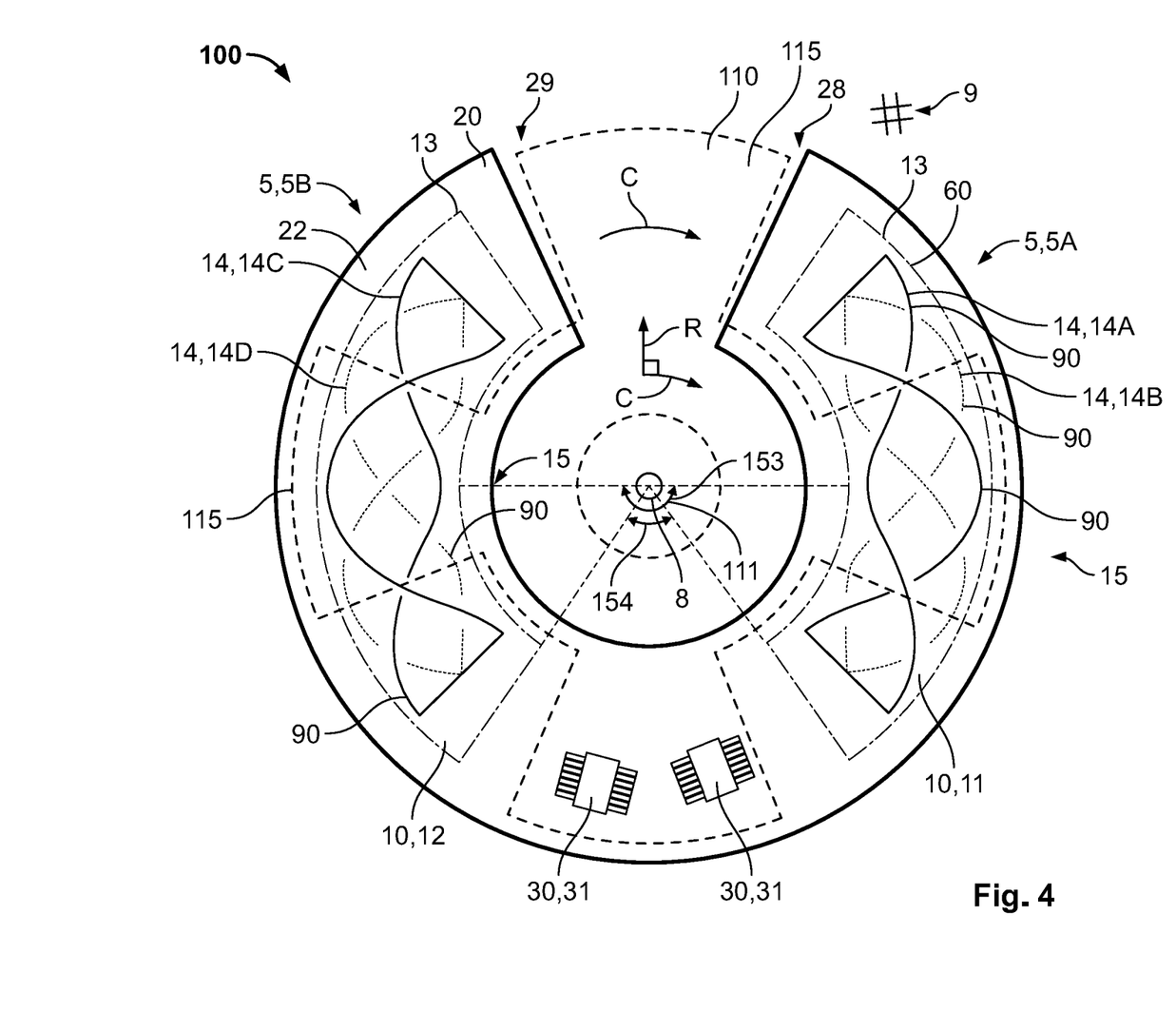
FIG. 4 is a schematic diagram of a sensor device according to another embodiment.

A sensor device 100 according to another embodiment is shown in FIG. 4. Again, central parts 15 of the two sensing elements 5 are shifted by 180 degrees. The rotational distance between the two transducers 10 is less than the shifting angle 153. An angle 154 of the rotational distance can, for example, be around 60 degrees in this case. This angle 154 can be measured from the end of one transducer 10, 11 to the neighboring end of the other transducer 10, 12. In the embodiment of FIG. 4, the first receiving members 14, 14A, 14C of the first and the second transducers 10, 11, 12 are embodied in a candy-shape. The second receiving members 14, 14B, 14D of the first and the second transducers 10, 11, 12 are embodied in an eye-shape having two convex areas enclosed by the conductors 90.

Figure 5:
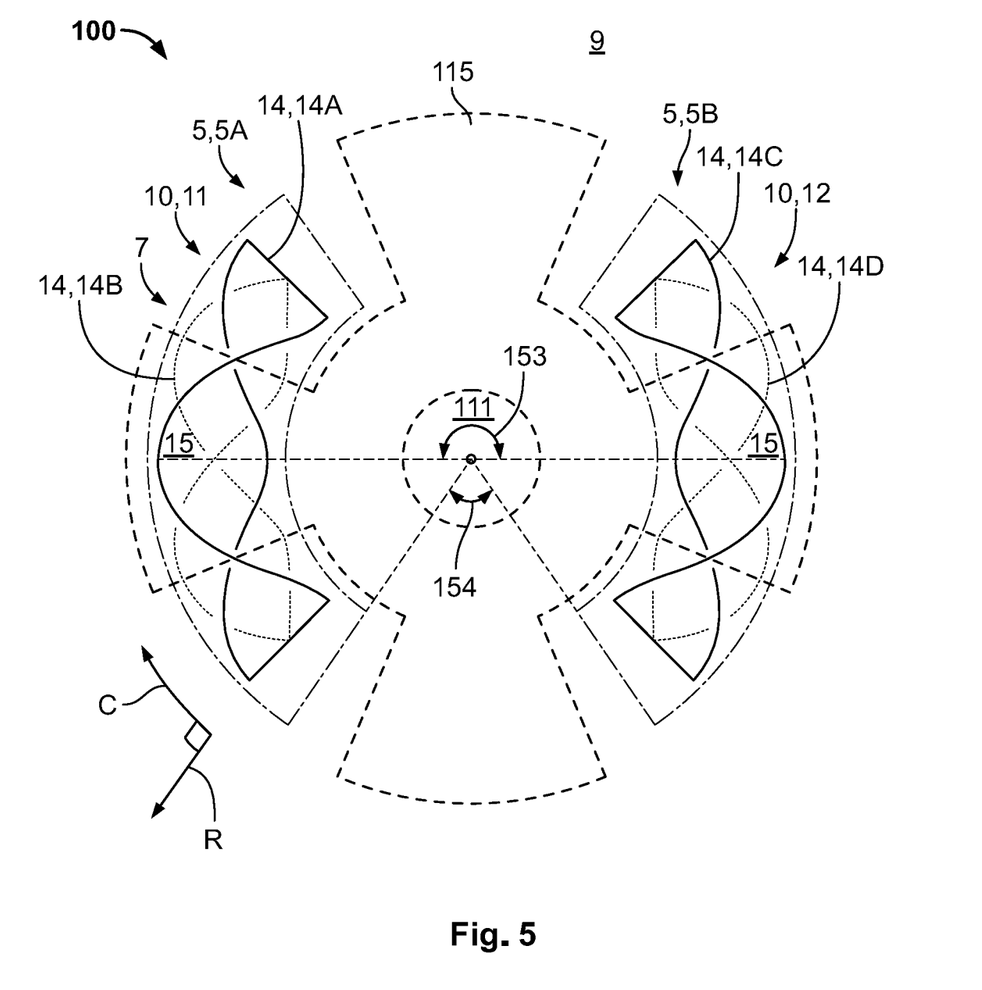
FIG. 5 is a schematic diagram of a sensor device according to another embodiment.

In FIG. 5, the transducers 10, 11, 12 are configured similar to the ones in FIG. 4. However, this embodiment does not comprise a PCB 22. The transducers 10, 11, 12 can be held by other means. Further, no control unit 30 is depicted. Such a control unit 30 can for example be located further away, for example in an engine control unit.

Figure 6:
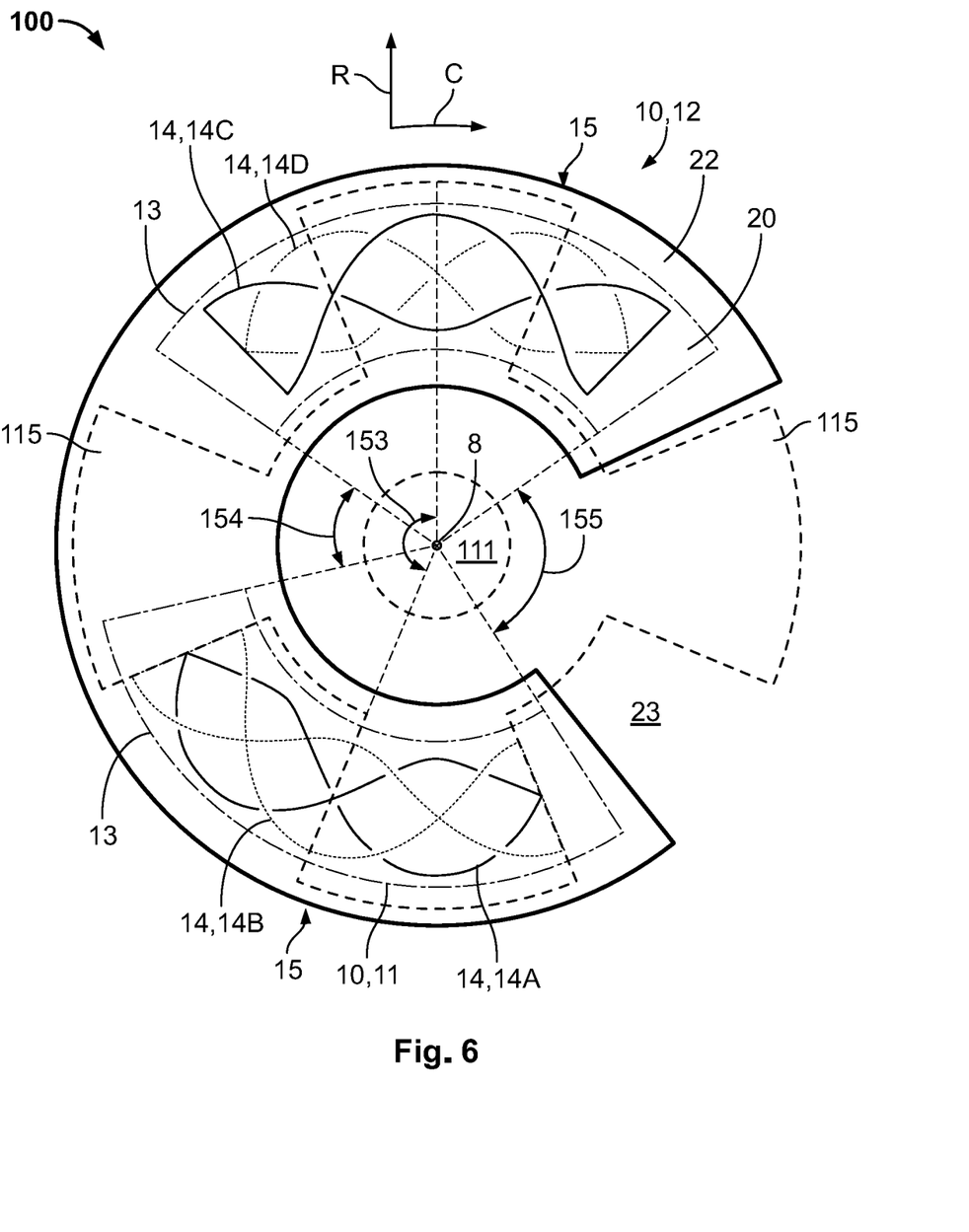
FIG. 6 is a schematic diagram of a sensor device according to another embodiment.

In another embodiment shown in FIG. 6, the transducers 10, 11, 12 each again have one candy-shaped receiving member 14 and one eye-shaped receiving member 14. However, the two transducers 10, 11, 12 are not located exactly opposite to each other relative to the axis 8. Rather, an angle 153 between central parts 15 of the two transducers 10, 11, 12 is less than 180°. In this example, the angle is 157.5° (180°-90°/4) as the number of flaps 115 is four. Due to this, the flaps 115 overlap the first receiving members 14A, 14C of the two transducers 10, 11, 12 simultaneously. The signals from these two receiving members 14, 14A, 14C can thus be combined simply, and they automatically provide the advantage of an improved position measurement, even when the shaft 111 is shifted.

Figure 7:
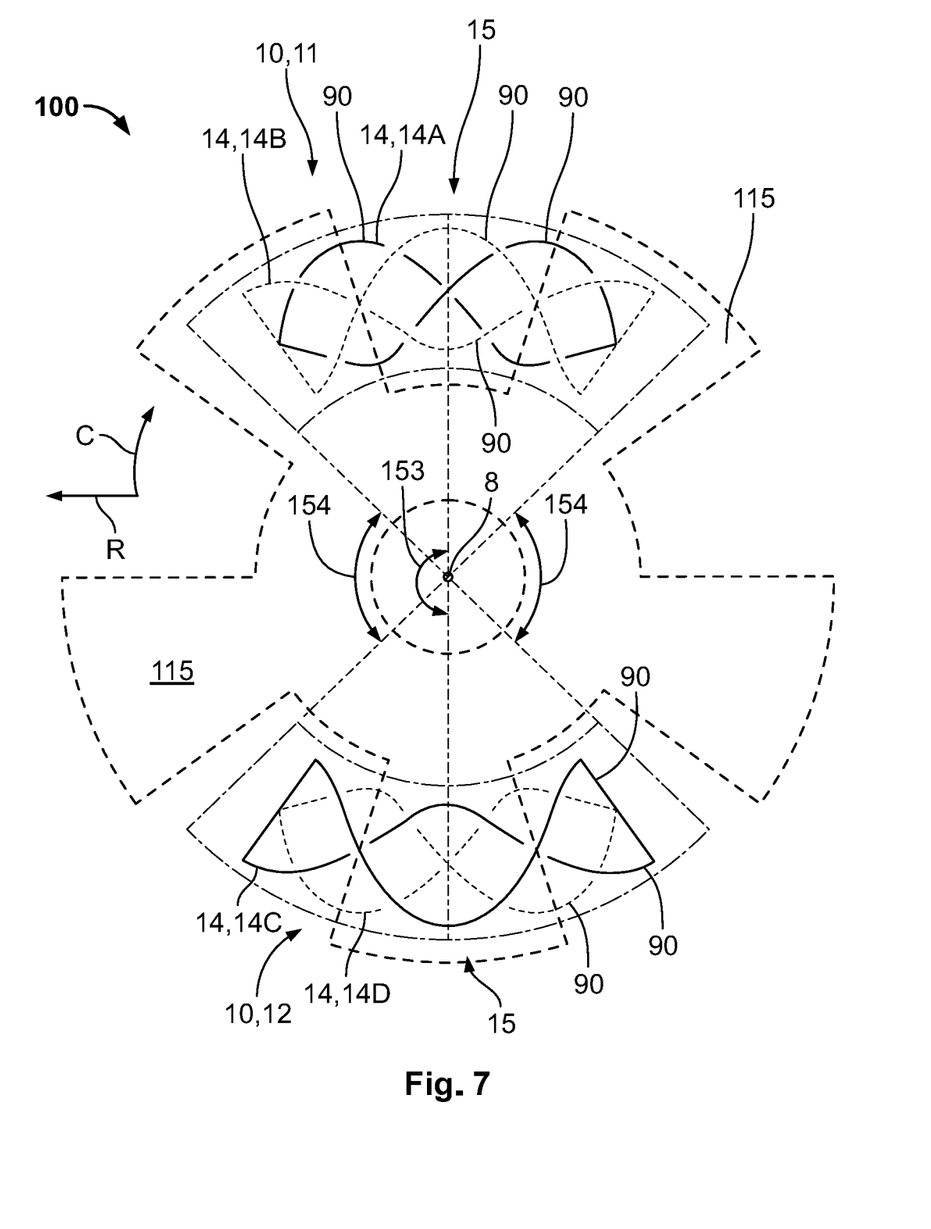
FIG. 7 is a schematic diagram of a sensor device according to another embodiment.

In FIG. 7, an embodiment is shown in which five flaps 115 are present. In such a case, it is not necessary to shift the two transducers away from the 180°-configuration. Rather, they can be located precisely opposite each other. Such a shifting is also not necessary for cases where there is an other odd number of flaps 115, for example three flaps, seven flaps, and so on.

Figure 8:
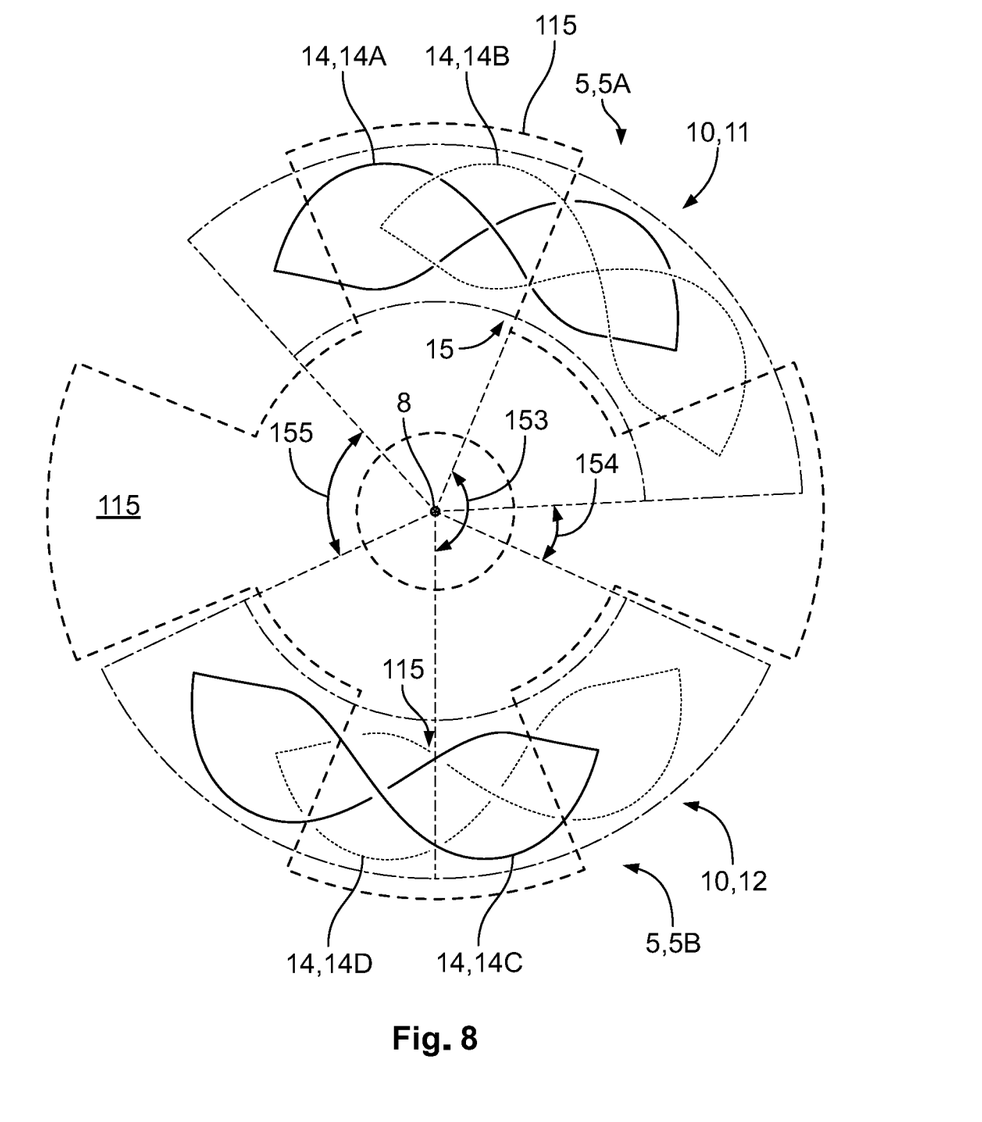
FIG. 8 is a schematic diagram of a sensor device according to another embodiment.

FIG. 8 shows a configuration in which all of the receiving members 14 are configured in the eye-shape. When using such an embodiment together with an even number of flaps 115, for example four flaps 15, a shifting of the two transducers 10 away from the 180°-position relative to each other is advantageous. In the depicted embodiment, the transducers 10, 11, 12 are again shifted by 22.5° (=90°/4) relative to the 180°-position so that the angle 153 between central part 15 is again 157.5°. Hence, the angle 154 of a rotational distance between the two transducers 10, 11, 12 is smaller and then the corresponding angle 155 on the other side.

The shifting of the sending elements 5 with respect to each other allows a more precise measurement, even when misalignment occurs. For example, if the rotatable element 110 is shifted without rotating, this could be interpreted as a rotation by a single sensing element as the signal in the sensing element changes. The use of two sensing elements 5 can avoid such a misinterpretation, as the shifting would be sensed by both sensing elements 5. The signals would however be different than for a rotation. For example, a shifting might lead to a signal increase in both sensing elements 5 while a rotation might cause a signal decrease in one sensing element 5 and a signal increase in the other sensing element 5. It can thus be inferred whether a rotation or a shifting has taken place. Such an eccentricity thus does not have an effect on the correct measurement of the rotational position.

What is claimed is:

1. A sensor device for measuring a rotational position of an element that is rotatable about an axis of rotation, comprising:
   a pair of sensing elements that are each an electromagnetic transducer, the transducers are identical and each have a first receiving member and a second receiving member, the first receiving member of one of the transducers is electrically coupled with the second receiving member of the other transducer; and
   an arcuate carrier on which the sensing elements are disposed, the sensing elements each have a central part, the central parts of the sensing elements are shifted with respect to each other by at least 120 degrees along the arcuate carrier about the axis of rotation, the arcuate carrier is formed as a printed circuit board and has an opening receiving the element perpendicular to the axis of rotation.

2. The sensor device of claim 1, wherein the transducers each have a sender member emitting a magnetic field, the first receiving member and the second receiving member receive the magnetic field.

3. The sensor device of claim 2, wherein the sender members are connected to each other.

4. The sensor device of claim 2, wherein one of the transducers is configured to emit and receive a first magnetic field.

5. The sensor device of claim 4, wherein the other of the transducers is configured to emit and receive a second magnetic field, a direction of the first magnetic field at the receiving members of the one transducer is opposite to a direction of the second magnetic field at the receiving members of the other transducer.

6. The sensor device of claim 2, wherein the sender member and/or at least one of the receiving members lie in a plane.

7. The sensor device of claim 2, wherein the sender member is a coil.

8. The sensor device of claim 2, wherein the sender member surrounds the receiving members.

9. The sensor device of claim 1, wherein each of the sensing elements is arranged closer to an end of the arcuate carrier than to a central part of the arcuate carrier.

10. The sensor device of claim 1, wherein the arcuate carrier extends more than 180 degrees around the axis of rotation.

11. The sensor device of claim 1, wherein the sensing elements are arranged opposite to each other relative to the axis of rotation.

12. The sensor device of claim 1, wherein the second receiving member of one transducer is electrically coupled with the first receiving member of the other transducer.

13. The sensor device of claim 1, further comprising a pair of controllers, each of the controllers is connected to one of the transducers.

14. The sensor device of claim 13, wherein the controllers are disposed on the arcuate carrier between the transducers.

15. The sensor device of claim 1, wherein the first receiving member and the second receiving member each have a pair of conductors embodied as conductive paths on the arcuate carrier.

16. The sensor device of claim 15, wherein the conductors of the first receiving member overlap with the conductors of the second receiving member.

17. The sensor device of claim 16, wherein the conductors of the first receiving member are insulated and separated from the conductors of the second receiving member.

* * * * *